Aug. 28, 1956 — E. SHORT — 2,760,460
BURGLAR ALARMS FOR WINDOWS, DOORS AND OTHER OPENINGS
Filed Aug. 9, 1952 — 4 Sheets-Sheet 1
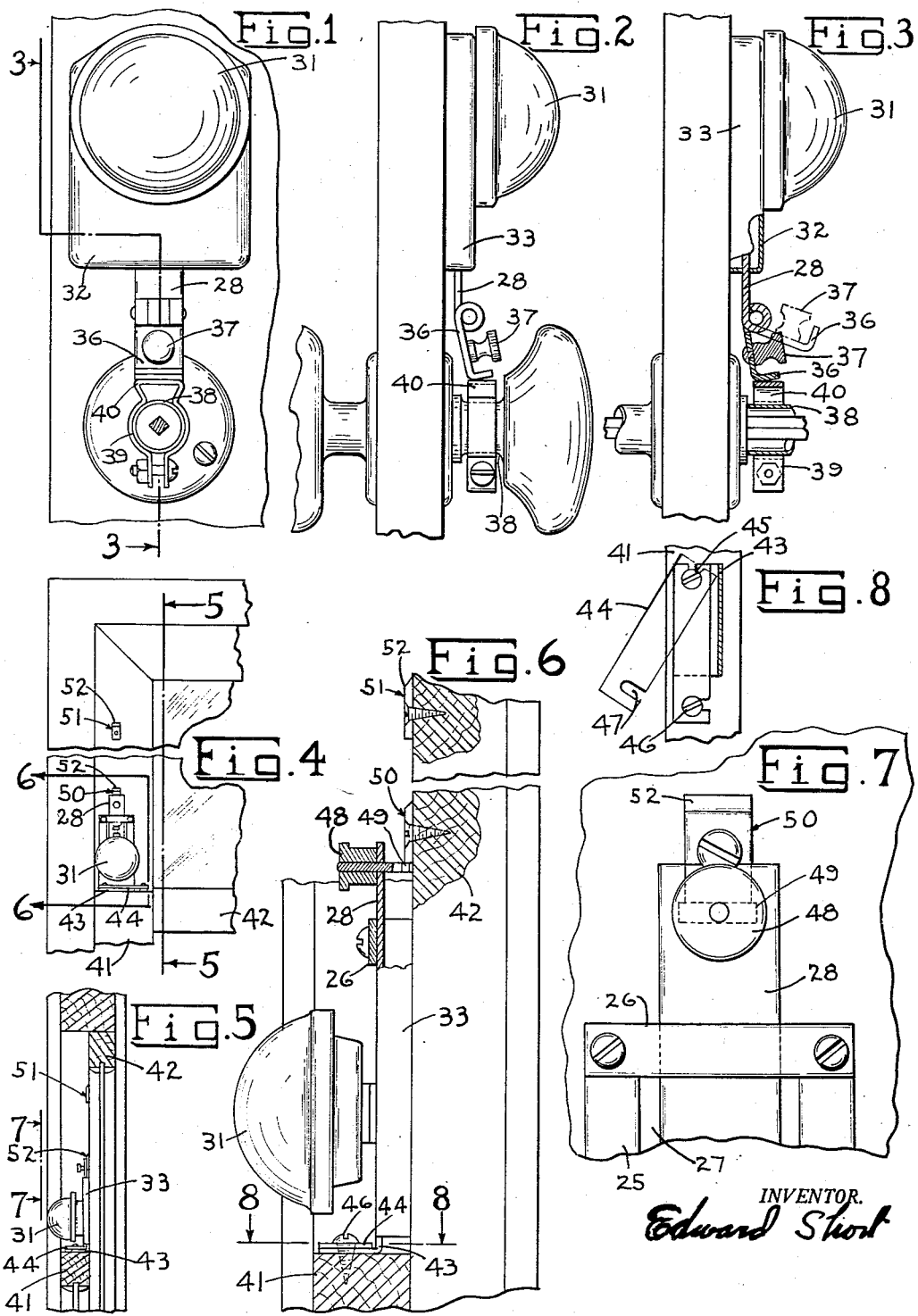
INVENTOR.
Edward Short Aug. 28, 1956 E. SHORT 2,760,460
BURGLAR ALARMS FOR WINDOWS, DOORS AND OTHER OPENINGS
Filed Aug. 9, 1952 4 Sheets-Sheet 2
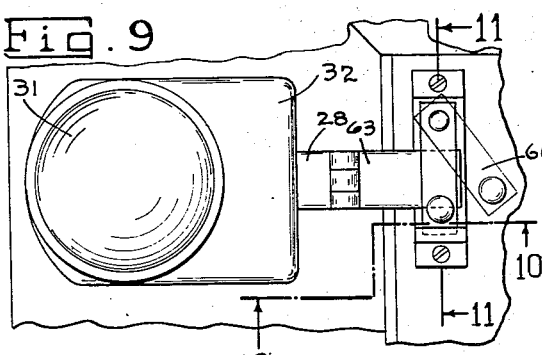
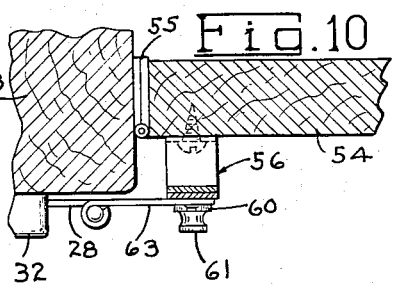
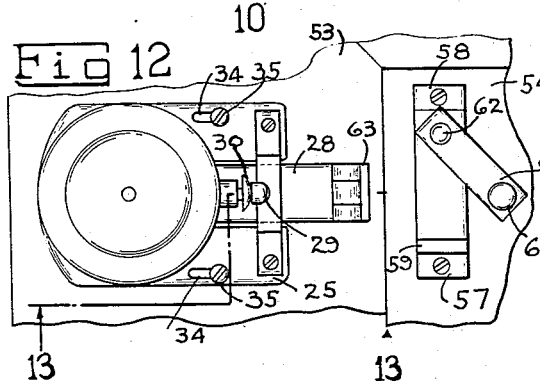
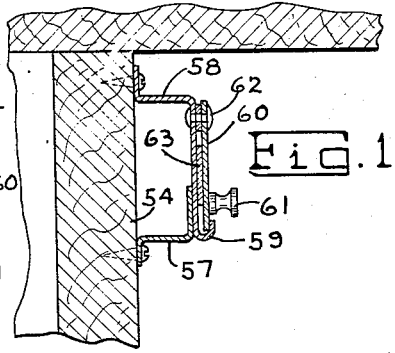
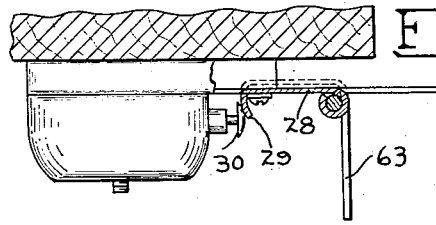
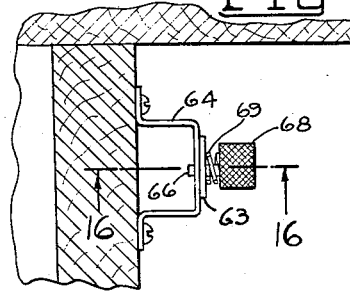
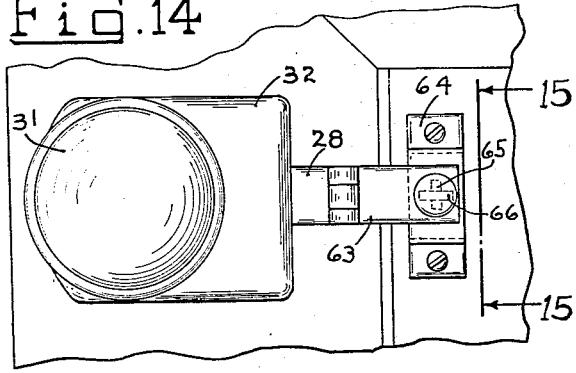
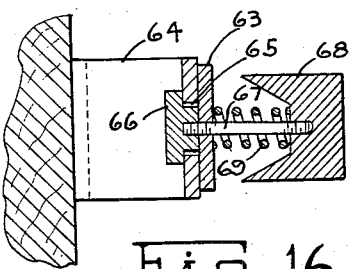
INVENTOR.
Edward Short

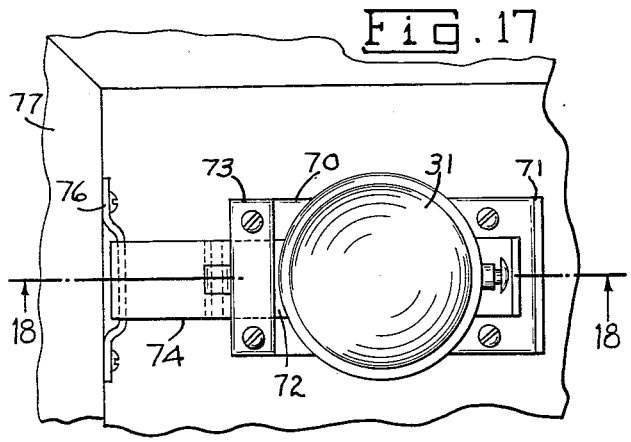
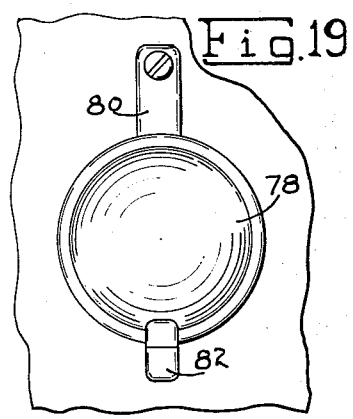
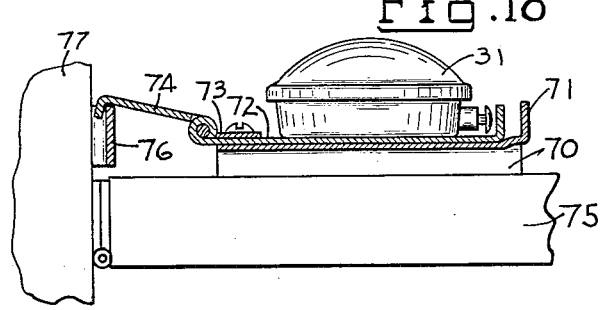
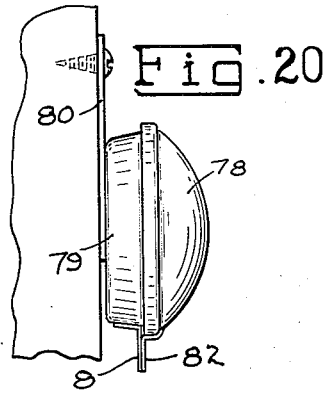
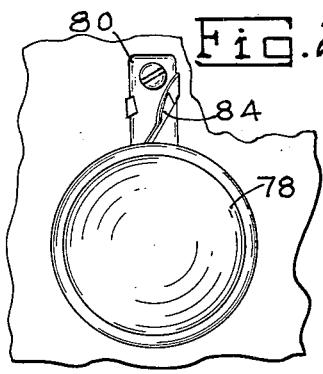
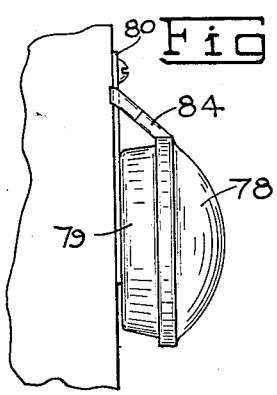
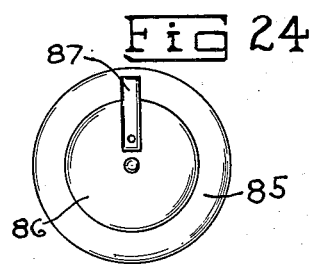
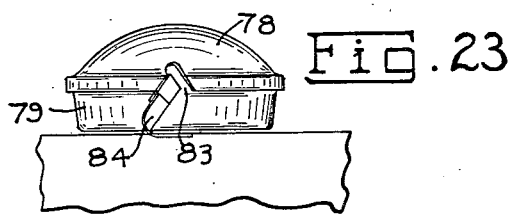

Aug. 28, 1956 E. SHORT 2,760,460
BURGLAR ALARMS FOR WINDOWS, DOORS AND OTHER OPENINGS
Filed Aug. 9, 1952 4 Sheets-Sheet 4
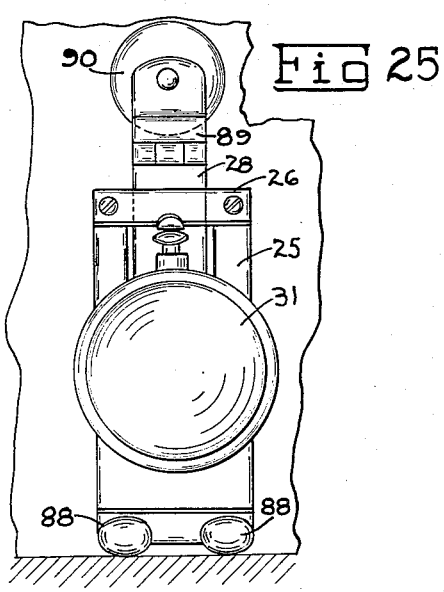
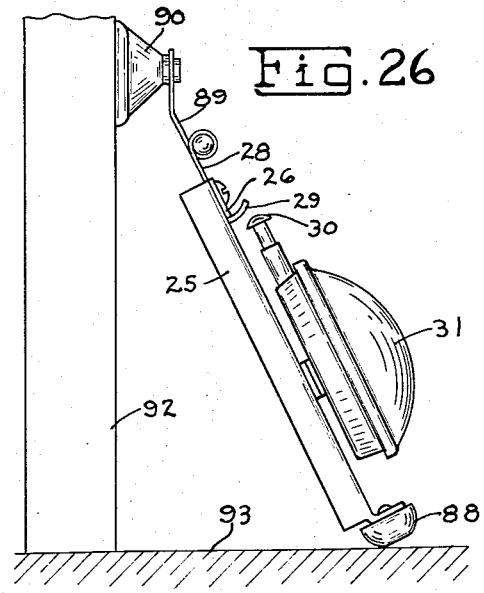
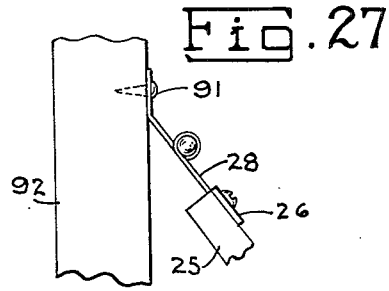
INVENTOR.
Edward Short

United States Patent Office 2,760,460
Patented Aug. 28, 1956

2,760,460

BURGLAR ALARMS FOR WINDOWS, DOORS AND OTHER OPENINGS

Edward Short, National City, Calif.

Application August 9, 1952, Serial No. 303,576

1 Claim. (Cl. 116—13)

In my United States Patent No. 2,022,943, of December 3, 1935, I disclosed a device whereby, when a door or window is attempted to be opened from the outside of a building, an alarm will be sounded so that the occupants of the building will be notified of the unauthorized attempt to gain acess. It was also an object of the invention in the above mentioned patent to provide a device for the stated purpose which was simple in construction and easily applied in an operative position and which also embodied means whereby the device might be rendered inoperative when so desired. The general object of this present patent is to provide a burglar alarm device of improved construction, leading to greater ease in application and increased certainty of operation.

Another object of this invention is to provide an improvement in the form of a housing covering the greater part of the mechanism and so formed as to harmonize in shape and coloration with the appearance of the alarm gong itself.

Another important object of this invention is to provide an improvement in which certain parts as used in the original device are omitted without detracting from the appearance or functional accuracy of the device.

Another purpose of this improved invention is to provide certain types of alarm mechanisms, specifically designed for use in trailer homes and other particular adaptations.

Another object of this invention is to provide an improved device which has been converted to the purpose of a fire alarm by the inclusion of several types of fusing strips releasable when subjected to certain predetermined ambient temperatures.

Additional objects and advantages will be apparent from the following description, considered in conjunction with the accompanying sheets of drawings or from both as supplements of each other, wherein are set forth certain novel features of construction, combination and arrangement of parts and functions.

In the accompanying sheets of drawings forming a part of these specifications and in which like numerals are employed to designate like parts:

Figure 1 is a front elevation of my improved doorknob type burglar alarm showing the doorknob removed and the device mounted on a portion of the door.

Figure 2 is a side elevation of Figure 1 including the addition of the doorknob in place.

Figure 3 is a partial cross-section taken on the line 3—3 of Figure 1 and shows the doorknob removed with the hinged abutment latch in both the operated and unoperated positions.

Figure 4 is a front elevation of a double hung window type of my improved burglar alarm with the improved cover mechanism removed and the whole device installed on a window.

Figure 5 is a partial cross-sectional side elevation of my double hung window type taken on line 5—5 of Figure 4.

Figure 6 is an enlarged cross-sectional side elevation taken on the line 6—6 of Figure 4, showing the stops and T-screw in partial cross-section.

Figure 7 is an enlarged front elevation of a portion of Figure 5 with cover removed, looking in the direction of line 7—7 and showing the T-screw engaging one of the stops secured to the window sash.

Figure 8 is a plan view taken on the line 8—8 of Figure 6 showing the releasable attachment strap.

Figure 9 is a front elevation of a door jamb type of my improved burglar alarm with the cover attached illustrating the hinged and interconnected locking and operating mechanism. Figure 10 is a cross-sectional view taken on the line 10—10 of Figure 9 particularly illustrating the interconnected locking and operating assembly while Figure 11 is a longitudinal cross-section of the assembly taken on line 11—11 of Figure 9. Figure 12 is a plan view similar to Figure 9 showing the locking and operating mechanism disengaged and with the cover removed, thus illustrating the plunger and cam details. Figure 13 is a partial cross-section taken on the line 13—13 of Figure 12 illustrating the method of disengaging the locking and operating assembly.

Figure 14 illustrates a modified locking assembly, while Figure 15 is a side elevation taken on the line 15—15 of Figure 14, and Figure 16 is also a cross-section taken on the line 16—16 of Figure 14, both showing the T-screw and latching pressure spring of this modified locking assembly.

Figure 17 is a front elevation of a trailer home type of my improved burglar alarm particularly adapted for use on trailer home doors and swinging windows, while Figure 18, a partial cross-section taken on the line 18—18 of Figure 17, illustrates this type of locking and plunger operating structure.

I have developed two types of my improved alarm device for fire alarm purposes, of which Figure 19 is a plan view and Figure 20 is a side elevation, both illustrating the fusible soldered strap and clip, bell gong locking assembly.

Figure 21 is a plan view of another fire alarm type of my improved alarm illustrating a slotted bell gong with an angularly inclined fuse link inserted therein. Figure 22 is a side elevation, and Figure 23 a back elevation of the fire alarm shown in Figure 21 illustrating the spring tensioned, slotted bell gong, locking means.

Figure 24 is a plan view of a conventional spring tensioned bell housing showing the spring and plunger stop member which is to be removed when the bell is used with the fire alarm types shown in Figures 19, 20, 21, 22 and 23.

I have developed another adaptation of my device particularly for the use of travelers, of which Figure 25 is a front elevation showing the cover removed and illustrating the position securing and fastening suction cup and rubber buttons. Figure 26 is a side elevation illustrating the unoperative position of the traveler's alarm, and Figure 27 is a partial view indicating the replacement of the suction cup by a pin point for insertion into the wood framing.

Referring now in detail to Figures 1 to 24, wherein for purposes of illustration are shown preferred embodiments of my invention, the numerals 25 indicate a base frame formed with a lengthwise depression, over one end of which is attached cross bar 26, thus forming a slot or guide 27 within which slides tongue 28. A projecting lug 29 is provided at the inner end of tongue 28 so as to press against the operating button 30 of a standard type of spring-tensioned ratchet bell 31. Surrounding and covering this base frame 25 and its associated mechanism is pressed cover 32 provided with side walls 33 of sufficient strength and size to telescope over and securely clamp and hold by spring tension the edges of the base frame 25. Screw holes 34 are located at the sides of base frame 25 to accommodate screws 35 or other conventional means of securing the alarm in the desired position.

In my doorknob alarm, as shown in Figure 1, 2 and 3, at the outer end of tongue 28 is a hinged frictionally positioned abutment plate 36, to which is secured an operating button 37 for use in lifting the plate 36 to an inoperative position. Around the doorknob spindle sleeve 38 is releasably secured a clevis 39 formed with an eccentric offset portion 40.

In the double hung window type alarm as shown in Figures 4, 5, 6, 7 and 8, the numerals 41 indicate the lower sash of a window and 42 the upper sash of a window. In order to fasten the alarm to the top edge of the bottom sash 41 of the window the base frame 25 is provided with an angular mounting clip 43. In order to provide ease of removal and placement a rotatable attachment strip 44 is loosely secured to the top edge of the bottom sash 41 by screws 45 and 46. A releasable turning movement of attachment strip 44 is allowed by the open ended slot 47 formed therein. To the other end of tongue 28 is secured a T-screw cam 48 with a projecting lug 49 extending close to the upper window sash 42, on which is fastened stop 50 above the projecting lug and a short distance higher up, 6 inches or so, is located another stop 51, both of which stops engage the projecting lug 49, thus setting off the alarm on any unauthorized attempt to gain access through the window. On both stops 50 and 51 the upper edges 52 are beveled to permit the passage of projecting lug 49 when closing the window. In order to open the window without setting off the alarm the T-screw cam 48 may be lifted over the stops 50 and 51, permitting the window to pass.

In the door jamb type alarm as shown in Figures 9, 10, 11, 12, 13, 14, 15 and 16, the numerals 53 indicate a door frame within which opens a door 54 provided with hinges 55. Near the hinged side of door 54 is secured a two-piece bracket 56 consisting of Z-clip 57, and Z-clip 58 which is provided with a re-entrant flange or hook 59. Engaging under hook 59 is a locking plate 60 provided with a button 61 by which it may be turned around pivot 62. To tongue 28 is secured a hinged plate 63 which, when operated, is tightly fastened by and between Z-clip 58 and locking plate 60 when locking plate 60 is engaged under hook 59.

As an alternative method of tightly securing and locking hinged plate 63 it may be provided with a T-screw latch consisting of a single bracket 64 in which is cut slot 65, through which extends the T-head 66. A stud 67 secured to T-head 66 extends through a hole in hinged plate 63 and is fastened to knurled knob 68. Surrounding stud 67 is a compression spring 69 forcing T-head 66 against bracket 64 and hinged plate 63.

In the trailer house type alarm, as shown in drawings 17 and 18, the base frame 70 is provided with an angle guard 71. Tongue 72 sliding within frame 70 and under cross bar 73 is provided with a hinged hook 74. After securing by suitable fastening means base frame 70 to the hinged door 75 the hinged hook 74 is inserted in the bracket 76 attached to the door frame 77.

In one type of my fusable fire alarm, as shown in Figures 19 and 20, the spring-tensioned ratchet bell 78 is rotatively secured to stationary base 79 to which is fastened mounting strap 80. Clip 81 is soldered to the stationary base 79, and strip 82 is soldered to the spring-tensioned ratchet bell 78. When the ratchet bell 78 is rotated to its maximum spring tension and strip 82 is brought to a contacting and superimposed position over clip 81 both are secured to each other by a low melting, readily fusible solder.

In the type of fusible fire alarm shown in Figure 21, 22 and 23, the spring-tensioned ratchet bell 78 is provided with an angularly disposed open ended slot 83 in which is hooked one end of the angularly inclined low melting point fuse link 84, while the other end is bent around and tightly secured under mounting strip 80.

In Figure 24 the numeral 85 indicates a stationary bell base, numeral 86 the rotating ratchet bell mechanism, and 87 the plunger stop spring controlling the starting and stopping of the rotating ratchet bell mechanism.

In my traveler's type of alarm, as shown in Figures 25, 26 and 27, the base frame 25 is provided with rubber buttons 88 at one end, and at the other end a hinged bar 89 is attached to tongue 28. To hinged bar 89 is secured a rubber suction cup 90 or attachment pin 91, by means of which, in conjunction with rubber buttons 88, the alarm may be braced against and securely fastened between the door, the substantially rigid securement to the door effected by the cup 90 or the pin 91 is important since these elements comprise means whereby the burglar alarm can be substantially permanently mounted on a door, the substantially rigid connection of the bar to the door allowing transmission of thrust through the hinge connection, while permitting the folding of the alarm into inoperative position without dismounting the alarm from the door 92 and the floor 93 in order to prevent unauthorized opening of the door.

Though all of the alarms described and shown herein are operated by the mechanical movement of a projecting lug which depresses an operating button of the ratchet bell mechanism, it is also contemplated that the projecting lug may separately and in addition close an auxiliary electric circuit for activating a supplementary remote controlled electric bell, or other visual and audible signals.

From the preceding description it may be readily seen that I have provided herein adaptations of my alarm which are specifically suited to the various sets of circumstances and conditions surrounding their actual use. All of the devices are so constructed that they occupy relatively little space, are easily adjusted and applied, and by operating the hinged locking or setting mechanisms definite control may be obtained of both authorized and unauthorized attempts to gain access to the premises guarded by the alarms. To use both the burglar alarms and fire alarms it is necessary only to select the proper type for the indicated use, and then install and set the locking control devices in the operative position.

It will be understood that while the form of my alarm mechanism herein illustrated and described is to be considered as a preferred embodiment of my invention, I do not limit myself to the precise constructions as disclosed, but reserve the right to resort to and substitute various modifications and changes in shape, size and arrangement of parts, without departing from the spirit of my invention or the scope of my claim as described and indicated above and in the drawings and in the following claim:

Having thus described my invention I claim:

A burglar alarm comprising an elongated frame, floor-contacting resilient members secured to one end of said frame, a bell mounted on an intermediate portion of said frame and having an operating button extending toward the other end of said frame, said other end having a depression extending longitudinally of the frame, a tongue slidably mounted in said depression and guided thereby, a cross bar terminally secured to said frame and bridging said depression and comprising means to hold said tongue within said depression, said tongue having a lug engaging said operating button when the tongue is moved in one direction, a bar having substantially rigid securement means at one end for attachment of the bar to a door, and a hinge connection joining the other end of said bar to the end of said tongue remote from said lug, whereby the burglar alarm can be substantially permanently mounted on a door, the substantially rigid connection of the bar to the door allowing transmission of thrust through said hinge connection, while permitting the folding of the alarm into inoperative position without dismounting the alarm from the door.

References Cited in the file of this patent

UNITED STATES PATENTS

| | | |
|---|---|---|
| 923,712 | Schwab | June 1, 1909 |
| 1,082,325 | Head | Dec. 23, 1913 |
| 1,130,436 | Schaffer | Mar. 2, 1915 |
| 1,367,899 | Swanberg | Feb. 8, 1921 |
| 1,892,503 | Dan | Dec. 27, 1932 |
| 2,022,943 | Short | Dec. 3, 1935 |
| 2,193,019 | Gauthier | Mar. 12, 1940 |
| 2,237,019 | Vinz | Apr. 1, 1941 |